(12) United States Patent
Jin et al.

(10) Patent No.: US 7,930,516 B1
(45) Date of Patent: Apr. 19, 2011

(54) LINKED LIST TRAVERSAL WITH REDUCED MEMORY ACCESSES

(75) Inventors: Xiangdong Jin, Albany, CA (US); Dongping Luo, Fremont, CA (US); Wen Wei, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/551,066

(22) Filed: Aug. 31, 2009

Related U.S. Application Data

(63) Continuation of application No. 11/427,952, filed on Jun. 30, 2006, now Pat. No. 7,600,094.

(51) Int. Cl.
*G06F 13/00* (2006.01)
*G06F 13/28* (2006.01)
*G06F 7/00* (2006.01)
*G06F 17/30* (2006.01)

(52) U.S. Cl. .......... 711/216; 711/E12.002; 707/800
(58) Field of Classification Search .......... 707/100, 707/800; 711/216, E12.002
See application file for complete search history.

(56) References Cited

U.S. PATENT DOCUMENTS

| 6,434,662 | B1 * | 8/2002 | Greene et al. ............ 711/108 |
| 7,020,782 | B2 | 3/2006 | Rajasekaran et al. |
| 2003/0086341 | A1 * | 5/2003 | Wells et al. ............ 369/13.56 |
| 2006/0085554 | A1 * | 4/2006 | Shah et al. ............ 709/235 |

OTHER PUBLICATIONS

Co-pending U.S. Appl. No. 11/427,952, filed Jun. 30, 2006, Xiangdong Jin et al., entitled "Linked List Traversal With Reduced Memory Accesses", 26 pages.

* cited by examiner

*Primary Examiner* — Matt Kim
*Assistant Examiner* — Edward J Dudek, Jr.
(74) *Attorney, Agent, or Firm* — Harrity & Harrity, LLP

(57) ABSTRACT

A linked list traversal system identifies when a linked list has become inefficient, either through attack or an undue multiplicity of collisions. A data unit is parsed to extract a key. A first hash result associated with the key is calculated based on a first hash function. A first linked list is identified based on the first hash result. It is determined whether the first linked list has been compromised. A second hash result associated with the key is calculated based on a second hash function when the first linked list has been compromised. A second linked list is established based on the second hash result, where the second hash result is different from the first hash result.

17 Claims, 5 Drawing Sheets

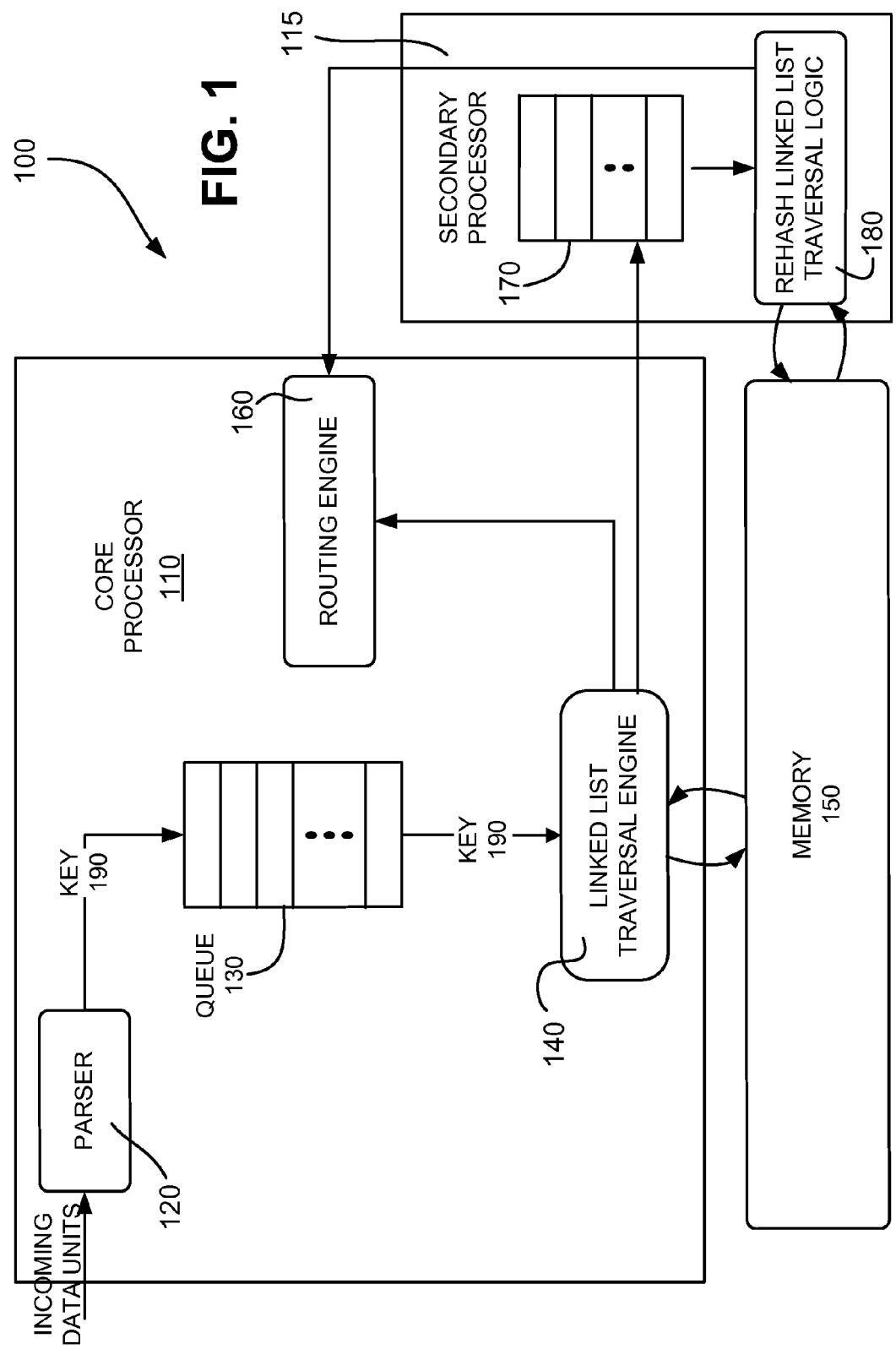

LINKED LIST TRAVERSAL WITH REDUCED MEMORY ACCESSES

RELATED APPLICATIONS

This application is a continuation of U.S. patent application Ser. No. 11/427,952 filed Jun. 30, 2006, the entire content of which is incorporated by reference herein.

BACKGROUND OF THE INVENTION

1. Field of the Invention

Implementations consistent with principles of the invention relate generally to data lookup, and more particularly, to data lookup using linked lists.

2. Description of Related Art

A hashed linked list is a widely used data structure for databases with long access keys. A hash function may be applied to each long access key, resulting in a hash result having a shorter length than the input key. Unfortunately, efficiently implemented hash functions may enable multiple input keys to map to an identical hash result. These hash collisions may be handled by linking related key data together in a linked list. A lookup into such a database typically requires a recursive search into the hashed linked list. Each phase of the recursive search requires a matching comparison of a key with data in the linked list. Such a process requires multiple accesses to external memories and multiple compare instructions.

SUMMARY OF THE INVENTION

One aspect consistent with principles of the invention is directed to a system including one or more memory units configured to store instructions and a number of linked lists of entries relating to a plurality of stored keys; a first processor configured to: receive a key, access data in a first linked list associated with the received key, identify whether the first linked list associated with the received key has an a predetermined number of links, and a second processor configured to: receive the key from the first processor when the first processor identifies that the first linked list associated with the received key has the predetermined number of links, and establish a second linked list based on the received key.

A second aspect consistent with principles of the invention is directed to a method including parsing a data unit to extract a key; calculating a first hash result associated with the key based on a first hash function; identifying a first linked list based on the first hash result; determining whether the first linked list has been compromised; calculating a second hash result associated with the key based on a second bash function, when the first linked list has been compromised; and establishing a second linked list based on the second hash result, where the second hash result is different from the first hash result.

An additional aspect consistent with principles of the invention is directed to a method that may include storing a first linked list in a memory based on a first hash value; receiving a data unit having a key that hashes to the first hash value; accessing the first linked list to search for the key; determining whether the first linked list has been potentially compromised; and generating a second linked list based on a second hash value calculated using the key when it is determined that the first linked list has been potentially compromised.

Yet another aspect consistent with principles of the invention is directed to a system including hardware means for traversing a first linked list to locate data from the first linked list associated with a key, wherein the hardware means determines whether the linked list has been compromised; and software means for receiving the key from the hardware means when the hardware means determines that the linked list has been compromised, wherein the software means generates a second linked list different from the first linked list.

BRIEF DESCRIPTION OF THE DRAWINGS

The accompanying drawings, which are incorporated in and constitute a part of this specification, illustrate one or more exemplary embodiments of the invention and, together with the description, explain the invention. In the drawings, FIG. 1 is a diagram of an exemplary system consistent with principles of the invention;

DETAILED DESCRIPTION

Figure 2A:
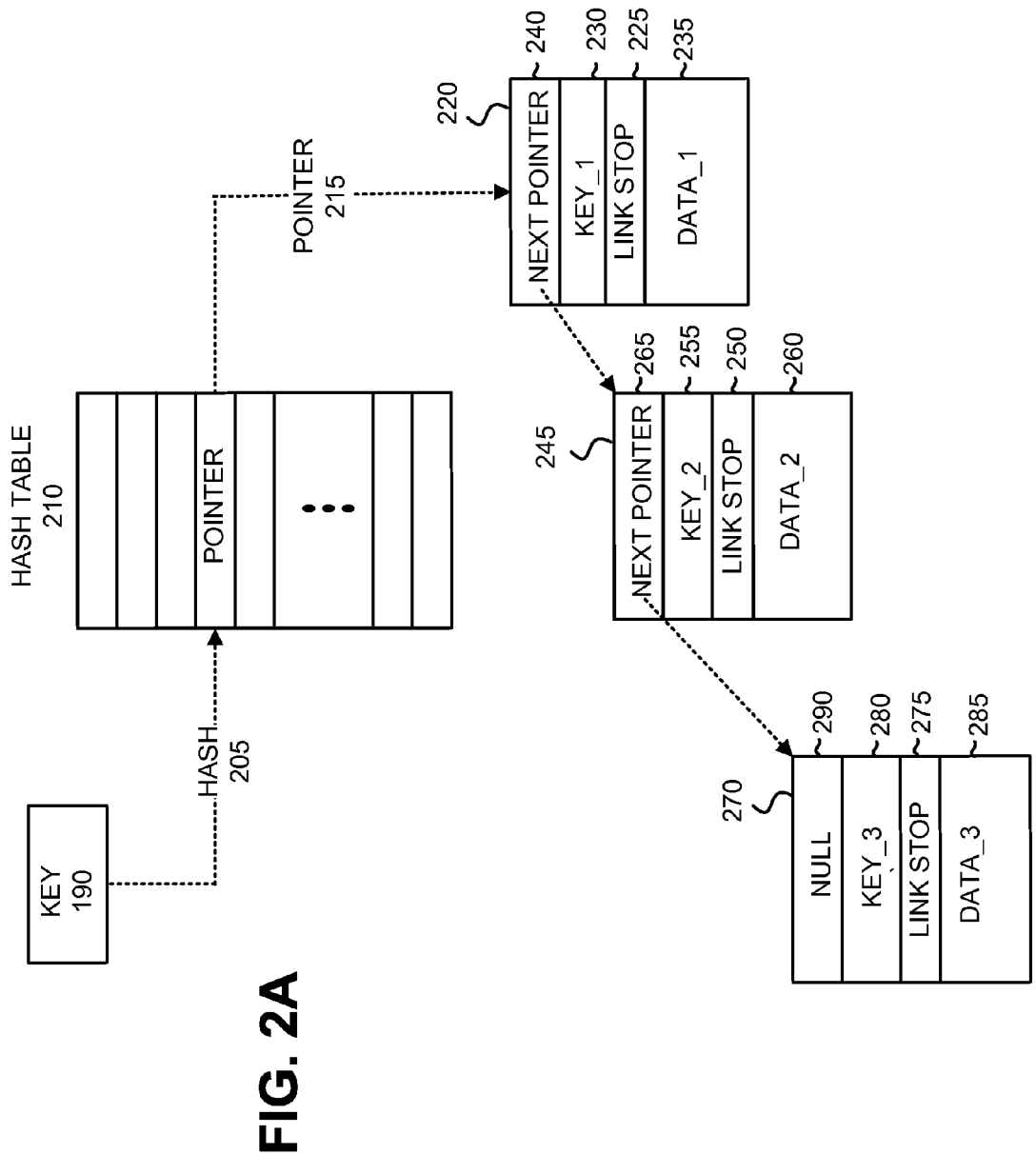
FIGS. 2A and 2B are diagrams of hashed linked list traversal operation consistent with one implementation of the invention.

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Consistent with principles of the invention, flow classification through linked list traversal may be aborted and offloaded to a secondary processor upon identification of a potentially compromised hash value. In one implementation, such a linked list traversal process may be initially implemented in hardware, with the offloaded processing being implemented in software. By identifying and offloading processing of compromised hash functions, performance of flow classification may be substantially improved.

Exemplary System

FIG. 1 illustrates an exemplary system 100 that may perform packet flow classification using a combination of software and hardware consistent with principles of the invention. System 100 may include a core processor 110, a secondary processor 115, and a memory 150. Core processor 110 may include a parser 120, a queue 130, a linked list traversal engine 140, and a routing engine 160. Secondary processor 115 may include a link stop queue 170 and a rehash linked list traversal engine 180.

Core processor 110 may include any type of processor or microprocessor suitable for implementing instructions to initiate a linked list traversal process consistent with principles of the invention. Parser may receive a stream of incoming data units (e.g., packets, cells, etc.) and may parse information included within the data units to generate a key 190 for each data unit. Header information used to identify a flow to which the packet belongs may be included within the data unit. For example, a data unit's source and destination IP addresses, its source and destination ports, and its protocol may make up a data unit's 5-tuple that is used to classify the data unit. In such an embodiment, this 5-tuple of information may constitute key 190 output by parser 120, although it should be understood that alternative data unit identifying information may be similarly incorporated into key 190.

Queue 130 may store a received key 190. Queue 130 may include a first-in-first out (FIFO) queue that queues the received key 190. A linked list instruction including key 190 may be passed from queue 130 to linked list traversal engine 140, to retrieve lookup data in memory 150 that corresponds to key 190. For example, if the block of data includes a data unit such as a packet, datagram, cell or other type of encapsulated data, the lookup data to locate in the linked list may include a network address of a next hop for forwarding the data unit across a network from a current node. Additionally, the lookup data may include flow information such as quality of service information, etc.

Memory 150 may store a table (not shown), such as a hash table, and may further store linked lists (not shown) that, in turn, may store data associated with incoming keys. As described briefly above, a hash table includes listings of entries based on a hash function or algorithm calculated using information associated with received or potentially received keys. In general, such a hash algorithm may be employed to reduce an input key into a result having a smaller size than that of the input key, thus decreasing the time taken to identify an initial entry. In making the reduction however, it becomes possible that several different keys will map to the same hash result, resulting in a hash "collision". The linked lists stored in memory 150 enable sequential access to each colliding entry for a given hash value.

Linked list traversal engine 140 may include hardware (e.g., appropriate gate-level digital circuitry or ASIC) that may perform a hashing operation on key 190 and identify a pointer value based on the hash results that points towards a first entry of the linked list in memory 150. Linked list traversal engine may further include hardware that may perform recursive linked list traversal operation that matches key 190 with corresponding data in the linked list based on the calculated hash result.

Linked list traversal engine 140 may receive key 190 from queue 130. In response to receipt of key 190, linked list traversal engine 140 may apply a first hash function to received key 190 and recursively search through the linked list pointed to by the pointer to identify linked list data that matches key 190. Linked list traversal engine 140 may retrieve data from the linked list in memory 150 that matches key 190 and pass the retrieved data on to routing engine 160 for subsequent route/classification processing. Alternatively, linked list traversal engine 140 may exhaust the linked list and determine that no entry matching key currently exists in memory 150. In this situation, linked list traversal engine 140 may generate a new entry identifying key 190 and may link the new entry to the end of the linked list associated with the calculated hash result.

Unfortunately, as the number of entries in the linked list increases, so do the number of memory accesses required to progress through the linked list. Significantly long linked lists may dramatically impact the performance of system 100 in routing or classifying data units. Further, it may be possible that a malicious attacker may gain knowledge of or otherwise ascertain a hash function used to generate the hash table in memory 150. In this manner, it may be possible for the attacker to submit multiple data units to system 100 that have different keys and yet result in an identical hash result. Consistent with principles of the invention, linked list traversal engine 140 may identify whether a given hash result has been compromised or has resulted in a number of collisions adversely impacting performance of system 100.

In one implementation consistent with principles of the invention, linked list traversal engine 140 may determine when a number of links associated with an identified hash result exceed a predetermined threshold, thereby indicating that the hash result and associated hash value have potentially been compromised. When the threshold has been exceeded, a link stop bit or multi-bit value associated with each linked entry in the hash table may be asserted.

Upon a subsequent access of an table entry having an asserted link stop bit, link traversal may be halted and key 190 may be forwarded to a queue 170 on secondary processor 115 for additional handling. Queue 170 may include a FIFO queue and may enqueue the received key 190. In one implementation, secondary processor 115 may include rehash linked list traversal logic 180 for executing instructions to receive key 190 from queue 170. Rehash linked list traversal software 180 may apply a hash function to key 190 that is different from the hash function applied by linked list traversal engine 140, resulting in a second pointer value associated with the new hash result.

Rehash linked list traversal software 180 may recursively search through the linked list pointed to by the second pointer to identify linked list data that matches key 190. Rehash linked list traversal software 180 may retrieve data from the linked list in memory 150 that matches key 190 and pass the retrieved data on to routing engine 160 for subsequent route/classification processing.

By identifying when a potential hash function and hash result have been compromised. Processing of data units resulting in the identified hash result may be processing using a modified or different hash function, thereby eliminating the performance impact of traversing an ever-lengthening linked list. By applying a new hash function to received data units mapping to a potentially compromised hash result, different hash results may be obtained. Memory accesses relating to these new hash results are significantly reduced compared to accesses required to traverse the former linked list. In many cases, memory accesses are reduced to a single access, since the incoming data unit was solely received for the purpose of reducing performance during traversal of the former linked list.

The number of system elements illustrated in FIG. 1 is provided for explanatory purposes only. A typical system 100 may include more or fewer elements than are illustrated in FIG. 1 and/or may be configured differently.

Exemplary Linked List Traversal

Figure 2B:
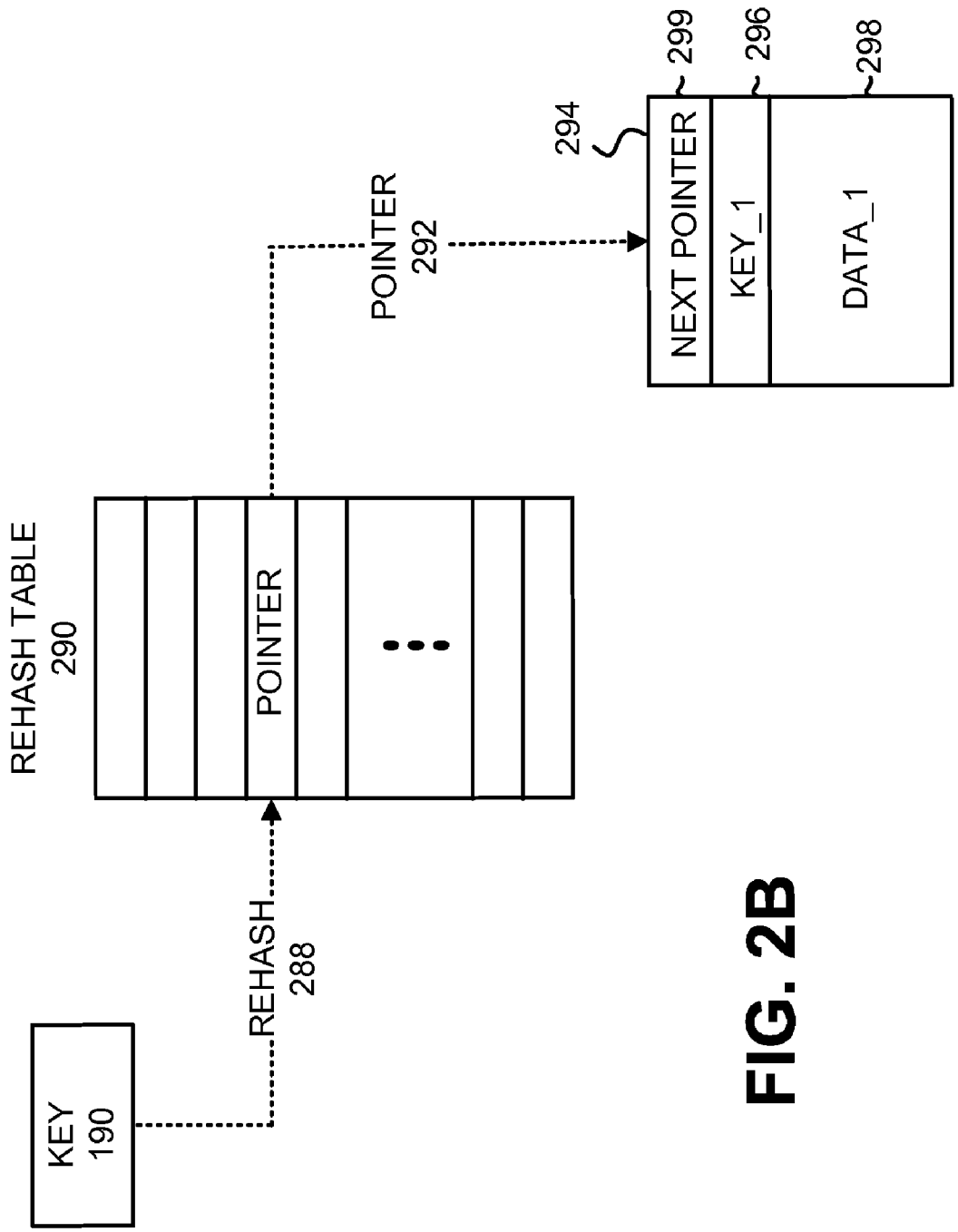

FIGS. 2A and 2B illustrate an exemplary linked list traversal operation consistent with principles of the invention. The exemplary operation shown in FIGS. 2A and 2B includes the use of a hashed linked list for linked list traversal. Other types of linked lists may be used consistent with principles of the invention. As shown in FIG. 2A, a first hash value 205 for key 190 may be determined. Existing hashing techniques may be used for determining first hash value 205, such as, for example, the MD5 message digest algorithm, the secure hash algorithm (SHA), the RACE Integrity Primitives Evaluation Message Digest algorithm (RIPEMD-160), or any other type of hashing technique. First hash value 205 may then be used to index a hash table 210 stored in memory 150 to retrieve a first pointer 215. As described above, in a linked list, data blocks having the same hashed keys are linked together logically (i.e., each data block has a pointer pointing to a next data block in the linked list).

A block of data 220 in the linked list may then be retrieved from memory 150 using the memory address contained in pointer 215. A link stop bit 225 in data block 220 may be extracted and examined to determine whether the bit has been asserted or not (e.g., is a 0, rather than a 1). If link stop bit 225 has been asserted, processing may continue to FIG. 2B, where key 190 is forwarded to queue 170 in secondary processor 115 for rehashing in the manner described below.

However, if link stop bit 225 has not been asserted, a key 230 may be extracted from the data block 220 and compared with key 190 to determine if they match. If key 190 and key 230 match, then data_1 235 may be extracted from data block 220 as the data that corresponds to key 190. For example, in an exemplary implementation in which key 190 includes a 5-tuple of information from a received data unit including the unit's source and destination IP addresses, source and destination ports, and protocol, data_1 235 extracted from data block 220 may include an identifier for a next hop node that the data unit should be forwarded to reach the node having the IP address. Data_1 235 may then be forwarded to routing engine 160, as shown in FIG. 1. If key 190 and key 230 do not match, then next pointer 240 may be extracted from data block 220.

Another block of data 245 in the linked list may be retrieved from memory 150 using the memory address contained in next pointer 240. A link stop bit 250 in data block 245 may be extracted and examined to determine whether the bit has been asserted. If link stop bit 250 has been asserted, processing again may continue to FIG. 2B, where key 190 is forwarded to queue 170 in secondary processor 115 for rehashing.

If link stop bit 250 is not asserted, a key 255 may be extracted from the data block 245 and compared with key 190 to determine if they match. If key 190 and key 255 match, then data_2 260 may be extracted from data block 245 as the data that corresponds to key 190. If key 190 and key 255 do not match, then next pointer 265 may be extracted from data block 245.

The linked traversal operation may continue until either an asserted link stop bit is found or a key extracted from the linked list matches key 135. For example, as shown in FIG. 2A, a final block of data 270 in the linked list may be retrieved from memory 150 using the memory address contained in next pointer 265. Link stop bit 275 is again not asserted and key_3 280 has been found to match key 190. Data_3 285 may be extracted from data block 270 as the data that corresponds to key_3 280 (also key 190).

As described above, once a link stop bit has been asserted in an entry associated with hash table 210, traversal of the linked list associated with table 210 is halted and key 190 is forwarded to queue 170 of secondary processor 115 for rehashing. Referring to FIG. 2B, rehash linked list traversal software 180 may determine a second hash value 288 for key 190. In accordance with principles of the invention, the rehash function may be different from the first has function, so as to result in a hash value 288 different than hash value 205. Second hash value 205 may then be used to index a rehash table 290 stored in memory 150 to retrieve a second pointer 292.

A block of data 294 in the linked list may then be retrieved from memory 150 using the memory address contained in pointer 292. If this is the first instance of hash value 288, data block 294 will be a new entry having a key_1 296 that matches key 190 and a data_1 entry 298 generally associated with the key value (e.g., relating to destination IP address, etc.) may then be forwarded to routing engine 160, as shown in FIG. 1. However, if data block 294 is not a new entry, key 296 may be extracted and examined to determine if it matches key 190. If not, a next pointer 299 may be extracted from data block 294 pointing to a new data block (not shown) in the rehashed linked list.

By identifying potentially compromised hash values and rehashing the keys associated with those values to generate new, non-compromised, hash values, memory accesses during linked list traversal may be minimized, thereby increasing performance of system 100.

Exemplary Processing

Figure 3A:
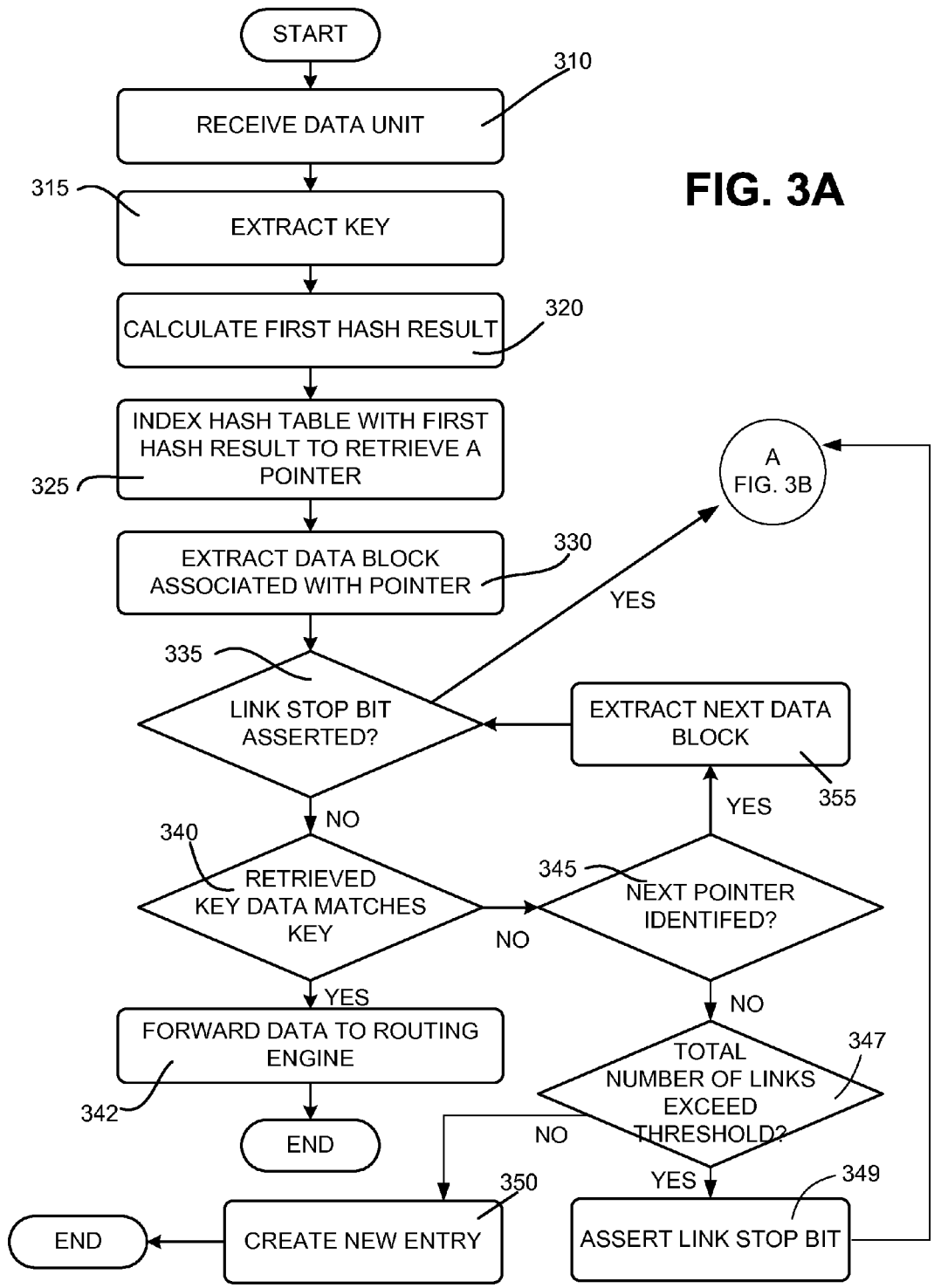
FIGS. 3A and 3B are flowcharts of an exemplary process for implanting the linked list traversal operation of FIGS. 2A and 2B consistent with principles of the invention.
Figure 3B:
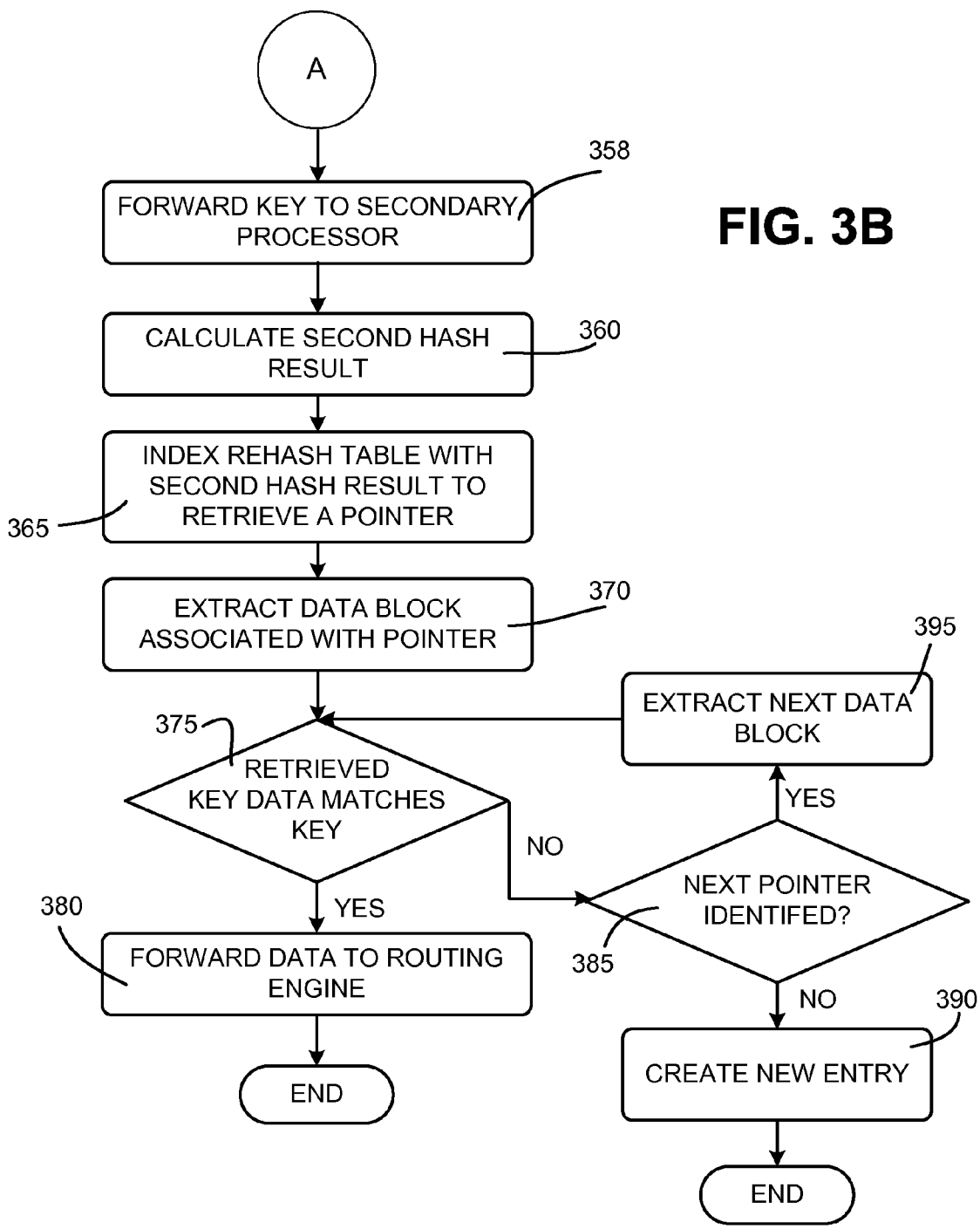

FIGS. 3A and 3B are flowcharts that illustrate exemplary processing by core processor 110 and secondary processor 115 consistent with principles of the invention. The exemplary process of FIGS. 3A and 3B may be implemented as a series of instructions stored in program memory (not shown). Alternatively, instructions associated with core processor 110 may be implemented in hardware, while instructions associated with second processor 115 may be implemented in software. In one exemplary implementation, by providing a majority of processing in hardware processor 110, efficiency of scale and speed may be realized. In still other alternatives, functions described below with respect processor 110 and processor 115 may be performed by any combination of hardware and/or software, hardware alone, or software alone. Second processor 115 may provide more dynamic processing aspects for responding to changing conditions, such as modifying a hash function in accordance with principles of the invention.

The exemplary process may begin with the receipt of a data unit such as a packet at parser 120 (act 310). Parser 120 may extract key information from the data unit and populate a queue 130 with the received key information (act 315). As described above, a key 190 may be associated with a block of data received by system 100. For example, if the block of data includes a data unit such as a packet, datagram, cell or other type of encapsulated data, key 190 may include information such as network addresses, interface ports and a protocol associated with the data unit.

A first hash for the received key may be determined (act 320). Existing hashing techniques, such as, for example, the MD5 message digest algorithm, the secure hash algorithm (SHA), the RIPEMD-160 message digest algorithm, or any other type of hashing technique may be used for determining a first hash value for the received key. First hash table 210 may be indexed with the determined first hash result to retrieve a pointer 215 (act 325). The retrieved pointer 215 may point to a block of data in a linked list stored in memory 150.

A data block associated with pointer 215 may be extracted from memory 150 (act 330). It may then be determined whether a link stop bit associated with the data block has been asserted (act 335). If the link stop bit remains unasserted, it is determined whether a key associated with the data block matches key 190 associated with the received data unit (act 340). If the keys match, the data associated with the block of data may be forwarded to routing engine 160 for additional processing (act 342).

If the keys do not match, it is determined whether the data block includes a next pointer identifying a next data block in the linked list (act 345). If not, it is determined whether a total number of links in the linked list exceed a predetermined value (act 347). If the predetermined number of links has been exceeded, it may be determined that the hash result associated with the linked list has been compromised and the link stop bit associated with the data block may be asserted (act 349). Otherwise, a new entry in the linked list may be created to reflect the unmatched key (act 350). However, if a next pointer is identified, the data block associated with the next pointer is extracted (act 355) and the process returns to act 335 for link stop and key analysis.

Returning to act 335, when it is determined that the link stop bit associated with the current data block has been asserted, key 190 is forwarded to queue 170 on secondary processor 115 (act 358 of FIG. 3B). In turn, key 190 may then be rehashed using a second hash function to generate a second hash result (act 360). Second hash table 290 may be indexed with the determined second hash result to retrieve a second pointer 292 (act 365). The retrieved pointer 292 may point to a block of data in a linked list stored in memory 150.

A data block associated with pointer 292 may be extracted from memory 150 (act 370). It may be determined whether a key 296 associated with the data block matches key 190 associated with the received data unit (act 375). If the keys match, the data associated with the block of data may be forwarded to routing engine 160 for additional processing (act 380). If not, it is determined whether the data block includes a next pointer identifying a next data block in the linked list (act 385). If not, a new entry in the linked list is created (act 390). However, if a next pointer is identified, the data block associated with the next pointer is extracted (act 395) and the process returns to act 375 for a key matching analysis.

The exemplary processing of FIGS. 3A and 3B may be repeated for each key received by system 100.

CONCLUSION

In implementations consistent with principles of the invention, a first processor may determine that a linked list has been compromised resulting in an inefficient number of links. Keys associated with the linked list may be offloaded to a second processor where a second linked list may be established. By providing offloading of inefficient linked lists to a secondary processor, lists having a large number of links may be avoided, thereby improving performance of the linked list traversal system.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while certain aspects of the invention have been described with respect to hashed link lists, any type of linked list may be used consistent with principles of the invention. While series of acts have been described in FIGS. 3A and 3B, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method, performed by a device, the method comprising:
    identifying, by one or more processors of the device, a first linked list based on a first hash value associated with a key extracted from a data unit;
    determining, by one or more processors of the device, that a total number of links in the first linked list exceeds a threshold when a link stop bit associated with a data block in the linked list has been asserted;
    calculating, by one or more processors of the device, a second hash value associated with the key when the total number of links in the first linked list exceeds the threshold, where the second hash value is different than the first hash value; and
    establishing, by one or more processors of the device, a second linked list based on the second hash value.

2. The method of claim 1, where the first hash value is determined using one of: an MD5 message digest algorithm, a secure hash algorithm, or a RIPEMD-160 message digest algorithm.

3. The method of claim 1, where the identifying the first linked list based on the first hash value further comprises:
    identifying a pointer address to a first link in the first linked list in a first hash table based on the first hash value.

4. The method of claim 3, further comprising:
    determining whether a data block, associated with the pointer address, in the first linked list includes a key matching the extracted key when the total number of links in the first linked list does not exceed the threshold;
    identifying a next link in the first linked list when the data block in the first linked list does not include a key matching the extracted key and when the data block includes a next pointer identifying a next data block in the linked list; and
    extracting data in the data block when the data block in the first linked list includes a key matching the extracted key.

5. The method of claim 4, further comprising:
    creating a new entry in the first linked list when the data block in the first linked list does not include a key matching the extracted key and when the data block does not include a next pointer identifying a next data block in the linked list.

6. The method of claim 1, further comprising:
    identifying a second pointer address to a first link in the second linked list in a second hash table based on the second hash value;
    determining whether a data block, associated with the second pointer address, in the second linked list includes a key matching the extracted key; and
    extracting data in the data block in the second linked list when the data block in the second linked list includes a key matching the extracted key.

7. A method, performed by a device, the method comprising:
    parsing, by a processor of the device, a data unit to extract a key;
    calculating, by the processor, a hash value, associated with the extracted key;
    identifying, by the processor, a linked list based on the hash value;
    determining, by the processor, that the linked list has been compromised when a total number of links in the linked list exceeds a threshold and when a link stop bit associated with a first data block in the linked list has been asserted;
    determining, by the processor, whether a second data block in the linked list includes a key matching the extracted key when the linked list has not been compromised;
    identifying, by the processor, a next link in the linked list when the second data block in the linked list does not include a key matching the extracted key; and
    extracting, by the processor, data in the second data block when the second data block in the linked list includes a key matching the extracted key.

8. The method of claim 7, further comprising:
calculating a second hash value associated with the key when the linked list has been compromised, where the second hash value is different than the hash value; and
establishing a second linked list based on the second hash value.

9. The method of claim 8, where the linked list is based on a first hash function and where the second linked list is based on a second hash function different from the first hash function.

10. The method of claim 7, where the identifying the linked list based on the hash value further comprises:
identifying a pointer address to a first link in the linked list in a first hash table based on the hash value.

11. The method of claim 7, where the hash value is determined using one of: an MD5 message digest algorithm, a secure hash algorithm, or a RIPEMD-160 message digest algorithm.

12. A system comprising:
a processor to:
identify a first linked list based on a first hash value associated with a key extracted from a data unit;
determine that a total number of links in the first linked list exceeds a threshold when a link stop bit associated with a data block in the linked list has been asserted;
calculate a second hash value associated with the key when the total number of links in the first linked list exceeds the threshold, where the second hash value is different than the first hash value; and
establish a second linked list based on the second hash value.

13. The system of claim 12, where the processor is further to:
determine the first hash value using one of: an MD5 message digest algorithm, a secure hash algorithm, or a RIPEMD-160 message digest algorithm.

14. The system of claim 12, where, when identifying the first linked list based on the first hash value, the processor is further to:
identify a pointer address to a first link in the first linked list in a first hash table based on the first hash value.

15. The system of claim 14, where the processor is further to:
determine whether a data block, associated with the pointer address, in the first linked list includes a key matching the extracted key when the total number of links in the first linked list does not exceed the threshold;
identify a next link in the first linked list when the data block in the first linked list does not include a key matching the extracted key and when the data block includes a next pointer identifying a next data block in the linked list; and
extract data in the data block when the data block in the first linked list includes a key matching the extracted key.

16. The system of claim 15, where the processor is further to:
create a new entry in the first linked list when the data block in the first linked list does not include a key matching the extracted key and when the data block does not include a next pointer identifying a next data block in the linked list.

17. The system of claim 12, where the processor is further to:
identify a second pointer address to a first link in the second linked list in a second hash table based on the second hash value;
determine whether a data block, associated with the second pointer address, in the second linked list includes a key matching the extracted key; and
extract data in the data block in the second linked list when the data block in the second linked list includes a key matching the extracted key.

\* \* \* \* \*